(12) United States Patent
Moeller et al.

(10) Patent No.: US 7,081,498 B2
(45) Date of Patent: Jul. 25, 2006

(54) PRESSURE-SENSITIVE ADHESIVE COMPOSITIONS AND CONSTRUCTIONS

(75) Inventors: Scott Allen Moeller, Munroe Falls, OH (US); Gary A. McMaster, Stow, OH (US); Timothy Smith, Kent, OH (US)

(73) Assignee: Morgan Adhesives Company, Stow, OH (US)

( * ) Notice: Subject to any disclaimer, the term of this patent is extended or adjusted under 35 U.S.C. 154(b) by 0 days.

(21) Appl. No.: 10/821,166

(22) Filed: Apr. 8, 2004

(65) Prior Publication Data
US 2004/0202814 A1    Oct. 14, 2004

Related U.S. Application Data

(60) Provisional application No. 60/461,897, filed on Apr. 10, 2003.

(51) Int. Cl.
C08L 53/00     (2006.01)
C08L 93/04     (2006.01)
C08K 5/01      (2006.01)

(52) U.S. Cl. .......................... 525/89; 525/95; 525/98; 525/99; 524/484; 524/499; 524/505

(58) Field of Classification Search .................. 525/89, 525/95, 98, 99; 524/484, 499, 505
See application file for complete search history.

(56) References Cited

U.S. PATENT DOCUMENTS

| | | | | |
|---|---|---|---|---|
| 3,625,752 | A | 12/1971 | Korpman | 117/122 |
| 3,932,328 | A | 1/1976 | Korpman | 260/27 |
| 3,956,223 | A | 5/1976 | Chiang et al. | 260/33.6 |
| 4,001,167 | A * | 1/1977 | Tungseth et al. | 524/476 |
| 4,024,312 | A | 5/1977 | Korpman | 428/343 |
| 4,288,480 | A | 9/1981 | Grzywinski et al. | 428/40 |
| 4,379,806 | A | 4/1983 | Korpman | 428/354 |
| 4,619,851 | A | 10/1986 | Sasaki et al. | 428/40 |
| 4,948,825 | A | 8/1990 | Sasaki | 524/274 |
| 5,149,741 | A | 9/1992 | Alper et al. | 525/95 |
| 5,274,036 | A | 12/1993 | Korpman et al. | 525/92 |
| 5,290,842 | A | 3/1994 | Sasaki et al. | 524/271 |
| 5,342,858 | A | 8/1994 | Litchholt et al. | 521/98 |
| 5,389,438 | A | 2/1995 | Miller et al. | 428/355 |
| 5,558,913 | A | 9/1996 | Sasaki et al. | 428/41.5 |
| 5,614,577 | A | 3/1997 | Sasaki et al. | 524/274 |
| 5,663,228 | A | 9/1997 | Sasaki et al. | 524/271 |
| 5,705,551 | A | 1/1998 | Sasaki et al. | 524/366 |
| 5,750,623 | A | 5/1998 | Diehl et al. | 525/98 |
| 5,827,609 | A | 10/1998 | Ercillo et al. | 428/354 |
| 5,856,387 | A | 1/1999 | Sasaki et al. | 524/271 |
| 5,869,562 | A | 2/1999 | Lindquist et al. | 524/505 |
| 5,891,957 | A * | 4/1999 | Hansen et al. | 525/89 |
| 6,025,071 | A | 2/2000 | Cameron et al. | 428/355 |
| 6,103,814 | A | 8/2000 | vanDrongelen et al. | 524/505 |
| 6,162,859 | A | 12/2000 | Lu et al. | 524/505 |
| 6,183,862 | B1 | 2/2001 | Ko et al. | 428/354 |
| 6,184,285 | B1 * | 2/2001 | Hatfield et al. | 524/505 |
| 6,214,935 | B1 | 4/2001 | Sasaki et al. | 525/89 |
| 6,369,126 | B1 | 4/2002 | Cinelli et al. | 523/105 |
| 6,384,138 | B1 | 5/2002 | Jacob et al. | 525/89 |
| 6,416,858 | B1 | 7/2002 | Ercillo et al. | 428/345 |
| 6,511,743 | B1 | 1/2003 | Ko et al. | 428/355 |

FOREIGN PATENT DOCUMENTS

WO    WO 97/30844    8/1997

OTHER PUBLICATIONS

ExxonMobil Chemical Escorez 2394 Product Specification, Jun. 2002.
Goodyear Wingtack ET Product Data Sheet, Jan. 2001.
Firestone Stereon 210 Product Specification, Mar. 2001.
Quintac 3520 SIS Polymer Product Specification, Jul. 3, 2000.
Quintac 3620 SIS Polymer Product Specification, Jul. 3, 2000.
Zeon Quintac 3433N, Introduction to Quintac, Jun. 1, 1999.
Quintac 3433N SIS Polymer Product Specification, Jun. 1, 1999.
Vector 4230 Product Specification, 2001.
ExxonMobil Chemical Escorez 2000 Series, Dec. 2001.
Mayzo BNX1225TPR, Additive Product Selection Guide, 2001.
Quintone D100 Product Specification, Date Issued Jul. 1, 2000.
International Publication Number WO 00/78886 A1, Dec. 28, 2000.

* cited by examiner

*Primary Examiner*—James J. Seidleck
*Assistant Examiner*—Olga Asinovsky
(74) *Attorney, Agent, or Firm*—Barnes & Thornburg LLP; Mark A. Hagedorn; Timothy J. Engling

(57) ABSTRACT

The present invention is directed to pressure-sensitive adhesive compositions and pressure-sensitive adhesive constructions fabricated using the pressure-sensitive adhesive compositions. The pressure-sensitive adhesive compositions comprise about 10 to about 40% of a styrene-isoprene block copolymer, about 5 to about 30% of a styrene-butadiene block copolymer, about 30 to about 65% of an aromatically modified tackifying resin, about 8 to about 30% of a plasticizing oil and optionally about 0.2 to about 2% of an antioxidant, wherein the percentages are based on the total weight of the composition.

55 Claims, 2 Drawing Sheets

PRESSURE-SENSITIVE ADHESIVE COMPOSITIONS AND CONSTRUCTIONS

This application claims the benefit of provisional application No. 60/461,897 filed on Apr. 10, 2003.

FIELD OF THE INVENTION

The present invention relates to pressure-sensitive adhesive compositions and pressure-sensitive adhesive laminate structures made therefrom. More particularly, the present invention relates to pressure-sensitive adhesive compositions and multilayer structures containing the inventive pressure-sensitive adhesive compositions that exhibit excellent tack and convertibility.

BACKGROUND OF THE INVENTION

Pressure-sensitive adhesives (PSA) are materials that have tack properties at room temperature. A PSA desirably adheres to a variety of dissimilar surfaces without the need of more than finger or hand pressure. Pressure-sensitive adhesives find extensive use in the fabrication of multilayer laminate constructions, such as labels and tapes.

Conventional pressure-sensitive adhesive constructions, such as labels, generally comprise a laminate of a facestock, a pressure-sensitive adhesive layer or layers, and a coated release liner. A variety of materials may be utilized for the facestock, but typically the facestock is formed from paper or plastic films. The facestock may be a multilayer construction. The release liner provides a support or backing from which the facestock and the PSA layers are peeled away just prior to label application. The release liner often comprises a paper or other suitable substrate coated with a release layer of silicone. Pressure-sensitive tape constructions generally comprise a facestock having an adhesive coated on one side with the opposing side providing release properties, although an additional release liner may be used.

Pressure-sensitive adhesive constructions, such as tape and label constructions, are typically manufactured as a continuous roll in various widths, and are then processed or converted to form a finished product comprising commercially useful labels, label stock or tape rolls. The process of converting often involves cutting all or part of the bulk laminate roll. For example, once a pressure-sensitive construction is formed, it can be converted into finished, useable labels through a die cutting process. The die cutting process involves precision cutting through the facestock and pressure-sensitive adhesive to the surface of or partially into the release liner to form the final product's outline. A matrix stripping process can then be utilized to strip away the excess facestock and PSA between individual labels outlined during the die cutting process. Other converting operations may include butt cutting, which includes similar precision cutting, guillotining, hole punching, perforating, slitting, and printing.

In additional to material costs, the speed and width at which the converting process may proceed without breaking the facestock are critical to the cost of converting the bulk laminate PSA construction into the finished product. When the PSA construction breaks, such as a failure in the facestock, costly press shutdowns are often incurred. Thus, the faster the PSA construction can be converted without disruptive failures, the lower the cost of the finished product. While most of the current narrow-web converting presses operate at speeds of less than 152 meters per minute (500 ft/min), newer modern wide-web converting presses are designed for operation at speeds of as high as 244 meters per minute (800 ft/min) or greater, and it is desirable to manufacture PSA constructions compatible with this converting speed.

All layers of the laminate impact the converting speed, and a tremendous amount of work has been aimed at optimizing the facestock and release surfaces for faster converting. For instance, increasing matrix stripping speed generally increases stripping force, which often results in matrix breaks, which force press shutdowns. This problem may be avoided by the use of higher strength facestocks, which may convert better than low strength facestocks at a range of converting speeds.

Historically, however, the pressure-sensitive adhesive layer has presented the greatest limiting factor with respect to the speed of converting bulk laminates into finished product. The converting industry desires an adhesive layer having good flow properties that can adhere to a wide variety of substrates. It is also desirable for the PSA to exhibit excellent tack properties over a wide range of temperatures, to be suitable for single layer coating and to be easily compounded. However, known adhesive compositions that are formulated to have these desired properties typically are complicated formulations that are not easily or inexpensively compounded, may require multiple layers of differing compositions or may not always convert well, oftentimes sticking to the cutting dies, smearing on the matrix and label edges, interfering with the precision cutting, or otherwise slowing down the converting process.

To date, achieving good convertibility has not automatically coincided with achieving excellent adhesive performance, cost of adhesive and/or ease of compounding. Conventional adhesives must be formulated to fit predetermined needs. Important properties include peel adhesion, tack, shear properties, viscosity at various temperatures, and the like. Previous attempts to improve pressure-sensitive adhesives for the manufacturing and converting industry have been met with limited success. For instance, U.S. Pat. No. 6,416,858 discloses multilayer pressure-sensitive adhesive constructions purported to exhibit improved convertibility and aging. However, this patent's constructions require two adhesive layers of different adhesive composition to obtain the stated benefits. Coating two layers of adhesive is undesirable due to the additional processing steps and/or machinery required, as well to the requirement of multiple adhesive inventories to be maintained.

International Patent Application WO97/30844 discloses a pressure-sensitive adhesive including an LVSI, low molecular weight styrene-isoprene diblock copolymer that is both expensive and difficult to use due to its high viscosity at ambient temperatures and tendency to oxidize when heated unless blanketed with an inert atmosphere such as nitrogen.

U.S. Pat. No. 5,290,842 shows a combination wherein a styrene-butadiene block copolymer is combined with a styrene-isoprene-styrene block copolymer to show two separate and distinct glass transition temperature peaks, indicating less than efficient tackification of the elastomer system and tack properties over a narrower range of temperatures. Only aliphatic tackifying components are disclosed to achieve these properties. U.S. Pat. Nos. 5,856,387 and 5,663,228 are similarly directed to PSAs having two distinct glass transition temperatures and incorporate aliphatic tackifiers.

U.S. Pat. Nos. 6,384,138 and 6,162,859 are directed to adhesives where the tackifier component comprises a blend of at least two or three hydrocarbon resins, thus requiring a complex and costly formulation.

Thus, it is desirable to provide a pressure-sensitive adhesive that is cost effective, easily manufactured or compounded, that provides excellent tack properties over a wide range of temperatures, that provides good adhesion to a wide variety of substrates of varying roughness, that may be applied over a wide range of temperatures and that provides excellent convertibility properties to constructions featuring the pressure-sensitive adhesive.

SUMMARY OF THE INVENTION

The present invention is directed to pressure-sensitive adhesive compositions and pressure-sensitive adhesive constructions fabricated using the pressure-sensitive adhesive compositions. The pressure-sensitive adhesive compositions provide cost-effective, less complex formulations that in turn provide good adhesion to a wide variety of substrates over a broad temperature range and which also convert well when utilized in pressure-sensitive adhesive constructions.

In one aspect of the present invention, a pressure-sensitive adhesive composition comprises about 10 to about 40% of a styrene-isoprene block copolymer, about 5 to about 30% of a styrene-butadiene block copolymer, about 30 to about 65% of an aromatically modified tackifying resin, about 8 to about 30% of a plasticizing oil and optionally about 0.2 to about 2% of an antioxidant, wherein the percentages are based on the total weight of the composition.

In another aspect of the present invention, a pressure-sensitive adhesive construction includes a facestock and an adhesive layer on the facestock. The adhesive layer comprises a pressure-sensitive adhesive composition comprising about 10 to about 40% of a styrene-isoprene block copolymer, about 5 to about 30% of a styrene-butadiene block copolymer, about 30 to about 65% of an aromatically modified tackifying resin, about 8 to about 30% of a plasticizing oil and optionally about 0.2 to about 2% of an antioxidant, wherein the percentages are based on the total weight of the composition. The pressure-sensitive adhesive construction may also include a release liner adjacent to the adhesive layer.

DETAILED DESCRIPTION OF THE PREFERRED EMBODIMENTS

Figure 1:
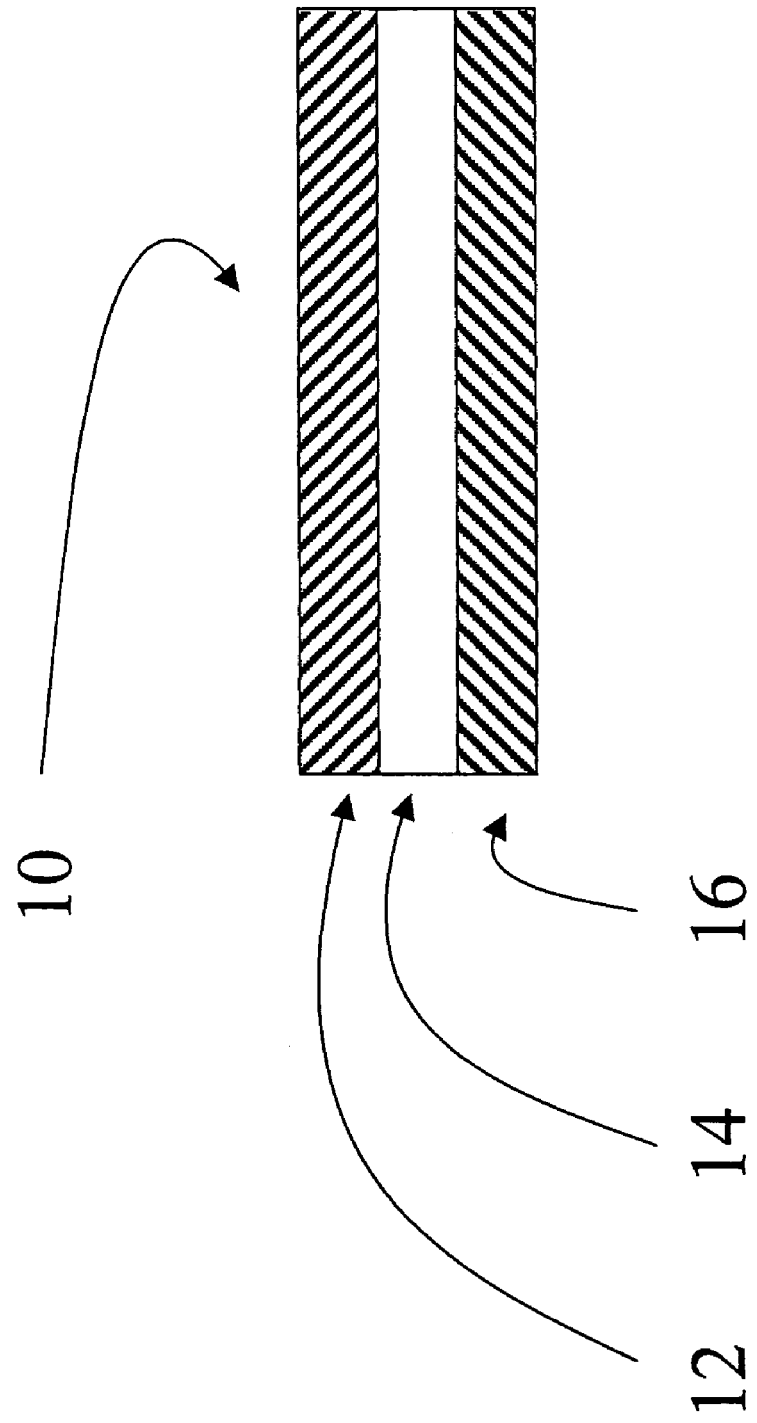
FIG. 1 is a cross-sectional view of a conventional pressure-sensitive adhesive construction.

The present invention is directed to pressure-sensitive adhesive compositions and adhesive constructions showing improved convertibility as well as good tack properties at a wide range of temperatures.

In a first aspect of the present invention, there is provided a pressure-sensitive adhesive composition having excellent tack and converting properties. The pressure-sensitive adhesive composition comprises a styrene-isoprene (SI) block copolymer, a styrene-butadiene (SB) block copolymer, an aromatically modified tackifying resin, a plasticizing oil and optionally an antioxidant, wherein the percentages are based on the total weight of the composition.

The SI block copolymer comprises about 10 to about 40% of the total adhesive composition, preferably about 13 to about 27%, more preferably from about 14 to about 22% of the total adhesive composition. The SI block copolymer may be a mixture of SIS triblock and SI diblock components containing from about 5 to about 80% by weight styrene-isoprene diblock component, preferably about 40 to about 60%, and more preferably about 50 to about 58% styrene-isoprene diblock component. The SI block copolymer may be of a multi-arm radial nature with a structure of $(SI)_n$, where n>2. Preferred SI block copolymers include, but are not limited to Kraton™ D1107 (a linear SIS copolymer having a reported specific gravity of 0.92, a Melt Index of 10 g/10 min, a styrene content of 14.5–15.5% weight and a diblock content of 15%), Kraton™ D1112 (a linear SIS copolymer having a reported specific gravity of 0.92, a Melt Index of 23 g/10 min, a styrene content of 13.3–16.3% weight and a diblock content of 38%) and Kraton™ D1113 (a linear SIS copolymer having a reported specific gravity of 0.92, a Melt Index of 24 g/10 min, a styrene content of 15.1–17.3% weight and a diblock content of 55%) elastomers available from Kraton Polymers U.S. LLC, Houston, Tex., USA; Quintac™ 3620 (a hybrid (mixed linear and radial polymer) SIS copolymer having a reported Melt Index of 9 g/10 min, a styrene content of 13.3–15.3% weight and a diblock content of 12%), Quintac™ 3433N (a linear SIS copolymer having a reported Melt Index of 12 g/10 min, a styrene content of 15.5–17.5% weight and a diblock content of 56%) and Quintac™ 3520 (a linear SIS copolymer having a reported Melt Index of 7 g/10 min, a styrene content of 14.0–16.0% weight and a diblock content of 78%) available from Zeon Chemicals, LLP, Louisville, Ky., USA; and Exxon™ DPX565 (having a reported Melt Index of 16 g/10 min, a styrene content of 14.8–16.2 % weight and a diblock content of 5 5%), Exxon™ DPX586 (a radial $(SI)_n SI$ block copolymer having a reported Melt Index of 35 g/10 min, a styrene content of 17.0–18.5% weight and a diblock content of 77%) and Vector 4230 (a radial (SI)n block copolymer having a reported specific gravity of 0.94, a Melt Index of 14 g/10 min, a styrene content of 20.0% weight and a diblock content of 30%) available from Exxon Mobil Corporation, Houston, Tex., USA.

The styrene-butadiene block copolymer comprises about 5 to about 30% of the total adhesive composition, preferably from about 8 to about 25%, and more preferably about 10 to about 18% of the total adhesive composition. The SB block copolymer can have a structure of SBS triblock, SB diblock or $(SB)_n$ radial or mixtures thereof. Preferred SB block copolymers comprise an SB diblock copolymer having from about 20 to about 35 wt. % styrene and from about 15 to about 20 wt. % block styrene. Preferred SB copolymers include Solprene™ 1205 (a linear random-block styrene-butadiene copolymer having a reported bound styrene content of 25%, a block styrene content of 17.5%, and a specific gravity of 0.93) available from Dynasol Elastomeros S.A. de C.V. of Mexico or Stereon™ 210 (an SB diblock having a reported bound styrene content of 25.0%, a block styrene content of 18.0%, and a specific gravity of 0.94) available from Firestone Synthetic Rubber and Latex Co., a division of Bridgestone/Firestone, Inc., Akron, Ohio, USA or Vector 2411 (a radial (SB)n block copolymer having a reported styrene content of 30 wt. %, a diblock content of 10–12 wt. %, and a specific gravity of 0.94) available from Exxon Mobil Corporation, Houston, Tex., USA.

The aromatically modified tackifying resin comprises about 30 to about 65%, preferably about 40 to about 52%, and more preferably from about 45 to about 52% of the total adhesive composition. The tackifying resin may preferably include between about 6 to about 35% by weight aromatic content and preferably has a softening point (as measured by ASTM test method E28) above about 85° C. More preferably, a softening point above about 90° C. generally prevents unwanted blocking prior to compounding. Preferred tackifying resins advantageously are not hydrogenated, and are not liquids at ambient temperatures. Exemplary and preferred resins include Wingtack™ Extra (an aromatically modified C5 hydrocarbon resin having a reported softening point of 97° C.), Wingtack™ 86 (an aromatically modified C5 hydrocarbon resin having a reported softening point of 86° C.) and Wingtack™ ET (an aromatically modified C5 hydrocarbon resin having a reported softening point of 94+/−3° C.), each available from Goodyear Chemical, Akron, Ohio, USA; Escorez 2394 (an aliphatic/aromatic hydrocarbon resin having a reported softening point of 91–97° C.) available from Exxon Mobil Corporation, Houston, Tex., USA; Piccotac™ 8095 (an aliphatic/aromatic resin having a reported softening point of 94° C.) available from Eastman Chemical Resins Inc., Kingsport, Tenn., USA; and Quintone™ D100 (a C5/C9 hydrocarbon resin having a reported softening point of 94–104° C.) available from Zeon Chemicals, LLP, Louisville, Ky., USA. The aromatically modified tackifying resin is advantageously selected to tackify both the SIS and SB copolymers without the need for additional tackifiers. Requiring only one tackifier advantageously improves product performance and adhesion over a wider temperature range because the single tackifier forms a solubility link between the styrene-isoprene and styrene-butadiene copolymers. This creates a more unified and homogeneous elastomer phase than is achieved using two copolymers and two tackifiers. Using only one tackifier also favorably reduces the complexity of the composition and its manufacture because fewer ingredients are used. The fewer ingredients provide manufacturing advantages such as better lot-to-lot consistency and allow continuous-flow production methods, such as twin-screw extrusion. Additionally, lower capital investment is required since less equipment is needed to feed components into the extruder. Use of a single tackifier provides buying power (cost reduction) by eliminating low volume, expensive components to plasticize or tackify different elastomers.

The plasticizing oil comprises about 8 to about 30%, preferably about 16 to about 22%, more preferably from about 17 to about 20% of the total adhesive composition. Preferred plasticizing oils include Shellflex™ 371 available from Shell Oil Products US, Houston, Tex., USA; Hydrocal 850 and CalSol™ 5550 available from Calumet Lubricants Co., Princeton, La., USA; and Drakeol 500 available from Conoco, Inc., Houston, Tex., USA.

Optionally, the adhesive composition may include an antioxidant, preferably in an amount of about 0.2 to about 2% of the total composition. Preferably, the antioxidant is contained in a resin carrier, such as BNX 1225 TPR (1:1 ratio of Mayzo™ BNX 1225 powder antioxidant and SIS copolymer) available from Mayzo, Norcross, Ga., USA. Utilization of a pelletized antioxidant proves advantageous to the adhesive compounding process. Addition of antioxidant alone would require very small quantities that prove difficult to measure (weigh) accurately. Use of a pre-blended pellet improves measurement accuracy and may further be used in continuous production methods, such as twin-screw extrusion since the pelletized antioxidant may be added directly to the extrusion process whereas powdered antioxidants cannot be added efficiently without problems.

Other conventional additives known to those skilled in the art may also be included in the adhesive compositions, such as cutting agents, waxes and surfactants, talc or powdered silicates, or filler agents, such as calcium carbonate. These may be incorporated during processing to improve the feeding consistency of elastomer system.

Representative adhesive compositions (C1 through C9) according to the present invention are set forth in Table 1. All values listed are percentage by weight.

TABLE 1

| Component | C1 | C2 | C3 | C4 | C5 | C6 | C7 | C8 | C9 |
|---|---|---|---|---|---|---|---|---|---|
| Kraton ™ D1113 | 10 | 35 | 15 | 13 | 15 | 15 | 22 | 21 | 22 |
| Solprene ™ 1205 | 25 | 5 | 10 | 13 | 16 | 18 | 11 | 12 | 7 |
| Quintone ™ D100 | 52 | 30 | 50 | 56 | 48 | 46 | 46 | 44 | 49 |
| BNX1225TPR | 1 | 2 | 1.5 | 1.5 | 2 | 2 | 2 | 2 | 2 |
| Shellflex ™ 371 | 12 | 28 | 23.5 | 16.5 | 19 | 19 | 19 | 21 | 20 |

Compositions C5 through C9 of Table 1 were tested to determine adhesion to different surfaces at ambient and cold temperatures. Loop tack values represent the force required to remove a 1 in. by 1.25 in. sample of semi-gloss paper facestock and the indicated adhesive composition from the test substrate. The test, based on ASTM D6195, which is incorporated herein by reference, is performed by forming a loop of test material, clamping the test material in the jaws of an Instron-type test apparatus, and then adhering the test material to the test substrate. The test material is then separated from the test substrate at 12 inches per minute. The adhesive layers were coated at 18.6 g/m². Values are shown in Table 2.

Figure 2:
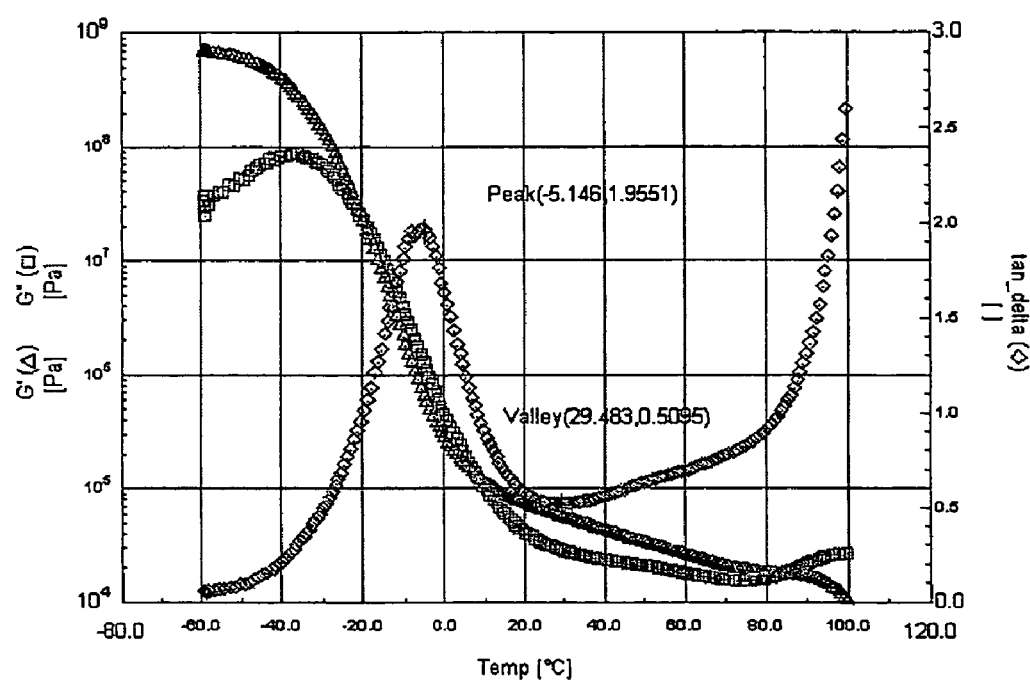
FIG. 2 is a plot of the tangent δ, loss modulus and storage modulus of adhesive Composition C8 of Table 1 as a function of temperature.

The minimum tangent delta (δ) value is the lowest value recorded between −20° C. and 100° C. Tangent δ values are measured by placing an approximately 1.5 mm thick sample of adhesive composition between two 8 mm plates on a controlled strain rheometer, such as an RDA-3 rheometer sold by Rheometric Scientific, Piscataway, N.J., USA. The plates are oscillated with respect to each other at a frequency of 1.59 Hertz and the parallel plates are heated at a rate of 3° C./min during the test. Measurements of the loss modulus, storage modulus and tangent δ are taken approximately every ten seconds. Similarly, the tangent δ, loss modulus and storage modulus of the adhesive composition may be measured using various frequencies, temperature ramp rates or strains, as is known by those skilled in the art. Values are shown in Table 2. FIG. 2 depicts a plot of tangent δ, loss modulus (G″) and storage modulus (G′) as a function of temperature for composition C8 as disclosed in Table 1.

TABLE 2

| Composition | Loop tack, psi @ 70° F., Corrugated Paperboard | Loop tack, psi @ 35° F., Corrugated Paperboard | Loop tack, psi @ 70° F., HDPE | Loop tack, psi @ 35° F., HDPE | Minimum tangent delta value |
|---|---|---|---|---|---|
| C5 | 2.1 | 0.3 | 3.4 | 0.5 | 0.61 |
| C6 | 2.0 | 0.4 | 3.0 | 0.8 | 0.59 |

TABLE 2-continued

| Composition | Loop tack, psi @ 70° F., Corrugated Paperboard | Loop tack, psi @ 35° F., Corrugated Paperboard | Loop tack, psi @ 70° F., HDPE | Loop tack, psi @ 35° F., HDPE | Minimum tangent delta value |
| --- | --- | --- | --- | --- | --- |
| C7 | 2.2 | 1.3 | 3.6 | 1.2 | 0.51 |
| C8 | 1.5 | 1.6 | 2.6 | 3.4 | 0.51 |
| C9 | 2.4 | 0.5 | 3.2 | 1.1 | 0.54 |

The results depicted in Table 2 illustrate that nonlimiting exemplary embodiments of the present invention show good adhesion to a variety of substrates and over a wide range of temperature. By optimizing the inventive formulation, component percentages can be determined that yield superior tack at both ambient and cold temperatures. This can be achieved while maintaining tangent δ values above 0.5 at temperatures above −20° C.

The following example further illustrates the present invention and is not intended to limit the invention in any manner. The full scope of the invention being limited solely by the claims appended hereto. A particularly preferred adhesive composition according to the present invention was prepared by combining 135 grams of Kraton™ D113 with 67 grams of Solprene™ 1205 and 6 grams of Mayzo BNX1225. For this batch process, the materials were masticated in a sigma blade mixer for 10 minutes. While continuing to mix the composition, 278 grams of Quintone™ D100 tackifier were slowly added over the next 15 minutes. Next, 115 grams of Shellflex™ 371 were added to the mixture over a five-minute period. Conventional additives, such as talc or calcium carbonate may then be added to the sigma blade mixer.

In a further, non-limiting embodiment of the present invention, a particularly preferred adhesive composition was prepared by combining 124 pounds per hour (pph) of Kraton™ D1113, 120 pph of Solprene™ 1205, 408 pph of Wingtack™ Extra, 136 pph of Shellflex™ 371, and 12 pph of Mayzo BNX1225TPR in a continuous-feed twin-screw extruder. The screw speed was set to 300 RPM and barrel temperatures were set to achieve an exit adhesive temperature of 330 degrees F. This adhesive composition was subsequently coated into a pressure-sensitive adhesive construction comprising a 50-pound EDP facestock, the inventive adhesive, a silicone-release coating, and a 3.2-mil liner substrate. The adhesive was applied at a coating weight of 18.6 g/m². To determine the convertibility characteristics of the inventive adhesive compared to a commercially available adhesive, commercial hot melt adhesive H2884, available from Bostik-Findley, was coated in the same construction at the same coat weight as the inventive adhesive. Both pressure-sensitive adhesive constructions were converted on a label-converting press, producing 6 labels across a web width of 17.6 inches. The construction comprising the inventive adhesive converted successfully at 789 feet per minute; whereas, the construction with a commercially available hot melt adhesive only converted well at 750 feet per minute. Adhesive compositions of the present invention are also preferable to such commercially available adhesives because they adhere over a broader range of temperatures and require fewer raw material ingredients to manufacture. Commercially available pressure sensitive hot melt adhesives with a similar broad range of application temperatures as the inventive adhesives have been successful at converting labels at speeds no greater than 475 feet per minute.

The adhesive compositions of the present invention are cost-effective, less complex, and provide excellent converting characteristics and excellent tack over a wide range of temperatures. The pressure-sensitive adhesive compositions of the present invention have a tangent δ value greater than 0.5 at all temperatures in the range of about −20° C. to about 100° C., which in turn results in excellent converting properties under a variety of press speeds, stock widths and operating temperatures. The SI block copolymer and SB block copolymer of the inventive compositions preferably form a single homogeneous phase in the compositions. The adhesives of the present invention express a single glass transition temperature, which is believed to translate into improved tack over a wide range of temperatures. The PSA compositions of the present invention advantageously have a dynamic-mechanical composite midblock glass transition temperature (D-M $CMT_g$) of about 258 Kelvin to about 288 Kelvin, preferably from about 263 Kelvin to about 283 Kelvin, and more preferably from about 268 Kelvin to about 282 Kelvin, as measure by an RDA-3 rheometer. The D-M $CMT_g$ is the temperature at which a rheometer measures a local maximum tangent δ value using the same test parameters mentioned previously. The adhesive compositions of the present invention may be optimized for specific uses by adjusting the various parameters, such as employing different ratios of the elastomers (SIS and SB copolymers), tackifier and plasticizing oil. For example, to give optimum adhesion performance in the temperature range of 20° C. to 25° C., an aromatically modified tackifying resin level of about 50 to about 60% would be recommended. To improve the cold-temperature performance, less tackifying resin may be used. The use of the aromatically modified tackifying resin allows the formulator to do this without sacrificing the converting performance of the adhesive.

Either a continuous or batch process may be used to prepare the pressure-sensitive adhesives according to the present invention. A continuous process is preferred as the present invention offers many advantages for the continuous process formulator. Although the manufacturing equipment must be heated and should be purged with an inert gas, none of the individual components of the compositions requires special handling.

Referring now to FIG. 1, a cross-sectional view of a conventional pressure-sensitive adhesive construction is shown generally as 10. Construction 10 features a facestock 12, a pressure-sensitive adhesive layer 14 of uniform composition in contact with the facestock 12, and a release layer 16, having a release surface thereon, in contact with the pressure-sensitive adhesive layer 14. One of ordinary skill in the art will appreciate that the facestock 12 and/or the release layer 16 may comprise multilayer constructions, but are illustrated as single layers for ease of illustration and description herein. For example, a layer of printed indicia may be included on the surface of the facestock 12 opposite the adhesive layer 14. Additionally, the release layer 16 may comprise a suitable substrate having a release coating deposited thereon, such as a layer of silicone.

Although the present invention is described in the context of a construction having a release layer, the present invention is equally applicable in the context of a construction such as for the production of tape in which the release layer is omitted and a release surface is provided on the opposite side of the facestock from the adhesive. It is contemplated that tape constructions may benefit from the advantages of the present invention during various converting operations involving cutting of the bulk tape roll, such as slitting.

Facestock 12, as depicted in FIG. 1, may comprise any of a variety of materials known by those of skill in the art to be suitable as a facestock material. For example, facestock 12 may be composed of such materials as paper, polyester, or other polymeric materials suitable for facestock use such as polyethylene or polypropylene. A requirement for facestock 12 is that it be capable of forming some degree of adhesive bond to adhesive layer 14, preferably by having layer 14 adhere to the material selected as the facestock.

Similarly, release layer 16 may comprise any of a variety of materials known to those of skill in the art. In one preferred embodiment, useful for label manufacture, release layer 16 comprises a silicone coated paper substrate. Additionally, release layer 16 may comprise a silicone-coated film substrate.

The adhesive layer 14 comprises a single homogeneous layer of an adhesive composition according to the invention as outlined above. The thickness of the adhesive layer 14 is typically characterized in terms of the number of grams of adhesive composition applied per square meter of the surface it is applied on. Generally, a coating weight of about 17 to about 20 g/m² is desired for typical pressure-sensitive adhesive constructions. However, the total coat weight may vary from about 12 to about 50 g/m². The adhesive layer of the present invention may be coated onto facestock or release liners by any means known to those skilled in the art.

Various embodiments of the invention have been particularly shown and described, however, it must be understood that these particular embodiments merely illustrate and that the invention is to be afforded its fullest interpretation within the terms of the appended claims.

What is claimed is:

1. A pressure-sensitive adhesive composition comprising:
   a) about 10 to about 40 wt. % of a styrene-isoprene block copolymer having a styrene content of from about 14% to about 20% by weight;
   b) about 5 to about 30 wt. % of a styrene-butadiene block copolymer;
   c) about 30 to about 65 wt. % of an aromatically modified tackifying resin; and,
   d) about 8 to about 30 wt. % of a plasticizing oil.

2. The adhesive composition of claim 1 further comprising about 0.2 to about 2.0 wt. % of an antioxidant.

3. The adhesive composition of claim 2 wherein said antioxidant comprises a pre-blended antioxidant in a resin carrier.

4. The adhesive composition of claim 1 wherein said styrene-isoprene block copolymer comprises from about 13 to about 27 wt. % of said composition.

5. The adhesive composition of claim 4 wherein said styrene-isoprene block copolymer comprises about 5 to about 80% by weight styrene-isoprene diblock component.

6. The adhesive composition of claim 4 wherein said styrene-isoprene block copolymer comprises about 40 to about 60% by weight styrene-isoprene diblock component.

7. The adhesive composition of claim 1 wherein said styrene-butadiene block copolymer comprises from about 8 to about 25 wt. % of said composition.

8. The adhesive composition of claim 7 wherein said styrene-butadiene block copolymer comprises from about 20 to about 35 wt. % bound styrene.

9. The adhesive composition of claim 8 wherein said styrene-butadiene block copolymer comprises from about 15 to about 20 wt. % block styrene.

10. The adhesive composition of claim 1 wherein said styrene-butadiene block copolymer comprises from about 10 to about 18 wt. % of said composition.

11. The adhesive composition of claim 10 wherein said styrene-butadiene block copolymer comprises from about 20 to about 35 wt. % bound styrene.

12. The adhesive composition of claim 11 wherein said styrene-butadiene block copolymer comprises from about 15 to about 20 wt. % block styrene.

13. The adhesive composition of claim 12 further comprising about 0.2 to about 2.0 wt. % of an antioxidant.

14. The adhesive composition of claim 1 wherein said aromatically modified tackifying resin has a softening point above about 85° C.

15. The adhesive composition of claim 14 wherein said aromatically modified tackifying resin comprises about 6 to about 35% by weight aromatic content.

16. The adhesive composition of claim 14 wherein said aromatically modified tackifying resin has a softening point above about 90° C.

17. The adhesive composition of claim 1 wherein said aromatically modified tackifying resin comprises about 6 to about 35% by weight aromatic content.

18. The adhesive composition of claim 1 wherein said aromatically modified tackifying resin has a softening point above about 90° C.

19. The adhesive composition of claim 1 wherein said aromatically modified tackifying resin comprises about 40 to about 52 wt. % of said composition.

20. The adhesive composition of claim 19 wherein said aromatically modified tackifying resin comprises about 6 to about 35% by weight aromatic content.

21. The adhesive composition of claim 19 wherein said aromatically modified tackifying resin has a softening point above about 85° C.

22. The adhesive composition of claim 21 further comprising about 0.2 to about 2.0 wt. % of an antioxidant.

23. The adhesive composition of claim 1 wherein said plasticizing oil comprises about 16 to about 22 wt. % of said composition.

24. The adhesive composition of claim 1 wherein said composition expresses a single glass transition temperature.

25. The adhesive composition of claim 1 wherein said adhesive composition has a tangent δ value of greater than 0.5 at all temperatures in the range of about −20° C. to about 100° C.

26. The adhesive composition of claim 1 wherein said composition has a composite midblock glass transition temperature of about 258 Kelvin to about 288 Kelvin.

27. The adhesive composition of claim 26 wherein said composition has a composite midblock glass transition temperature of about 263 Kelvin to about 283 Kelvin.

28. The adhesive composition of claim 26 wherein said composition has a composite midblock glass transition temperature of about 268 Kelvin to about 282 Kelvin.

29. The adhesive composition of claim 1 wherein said composition has a loop tack adhesion value to high density polyethylene greater than about 0.5 psi at 35° F.

30. The adhesive composition of claim 1 wherein said composition has a loop tack adhesion value to high density polyethylene greater than about 2.5 psi at 70° F.

31. The adhesive composition of claim 1 wherein said composition has a loop tack adhesion value to corrugated paperboard greater than about 0.3 psi at 35° F.

32. The adhesive composition of claim 1 wherein said composition has a loop tack adhesion value to corrugated paperboard greater than about 1.5 psi at 70° F.

33. A pressure-sensitive adhesive composition comprising:
 a) about 10 to about 40 wt. % of a styrene-isoprene block copolymer having about 5 to about 80% by weight styrene-isoprene diblock component having a styrene content of from about 14% to about 20% by weight;
 b) about 5 to about 30 wt. % of a styrene-butadiene block copolymer having from about 20 to about 35 wt. % bound styrene and about 15 to about 20 wt. % block styrene;
 c) about 30 to about 65 wt. % of an aromatically modified tackifying resin having between about 6 to about 35% aromatic content and a softening point above about 85° C.; and
 d) about 8 to about 30 wt. % of a plasticizing oil,
wherein said composition expresses a single glass transition temperature and has a tangent δ value of greater than about 0.5 for all temperatures in the range of about −20° C. to about 100° C.

34. The adhesive composition according to claim 33 wherein said styrene-isoprene block copolymer comprises about 13 to about 27 wt. % of said composition.

35. The adhesive composition according to claim 33 wherein said styrene-isoprene block copolymer comprises about 14 to about 22 wt. % of said composition.

36. The adhesive composition according to claim 33 wherein said styrene-butadiene block copolymer comprises about 8 to about 25 wt. %of said composition.

37. The adhesive composition according to claim 33 wherein said styrene-butadiene block copolymer comprises about 10 to about 18 wt. % of said composition.

38. The adhesive composition according to claim 33 wherein said aromatically modified tackifying resin comprises about 40 to about 52 wt. % of said composition.

39. The adhesive composition according to claim 33 wherein said aromatically modified tackifying resin comprises about 45 to about 52 wt. % of said composition.

40. The adhesive composition according to claim 33 wherein said composition has a composite midblock glass transition temperature of about 258 Kelvin to about 288 Kelvin.

41. The adhesive composition according to claim 40 wherein said composition has a composite midblock glass transition temperature of about 263 Kelvin to about 283 Kelvin.

42. The adhesive composition according to claim 40 wherein said composition has a composite midblock glass transition temperature of about 268 Kelvin to about 282 Kelvin.

43. The adhesive composition according to claim 33 further comprising about 0.2 to about 2.0 wt. % of an antioxidant.

44. A pressure-sensitive adhesive construction comprising:
 a) a face stock; and
 b) a pressure-sensitive adhesive layer coated on at least one surface of said face stock, said pressure-sensitive adhesive comprising:
  i) about 10 to about 40 wt. % of a styrene-isoprene block copolymer having a styrene content of from about 14% to about 20% by weight;
  ii) about 5 to about 30 wt. % of a styrene-butadiene block copolymer;
  iii) about 30 to about 65 wt. % of an aromatically modified tackifying resin; and,
  iv) about 8 to about 30 wt. % of a plasticizing oil.

45. The pressure-sensitive adhesive construction of claim 44 further comprising a release layer in contact with said pressure-sensitive adhesive layer.

46. The pressure-sensitive adhesive construction of claim 44 wherein said styrene-isoprene block copolymer comprises about 40 to about 60 wt. % by weight styrene-isoprene diblock component.

47. The pressure-sensitive adhesive construction of claim 44 wherein said aromatically modified tackifying resin has a softening point of greater than about 85° C.

48. The pressure-sensitive adhesive construction of claim 44 wherein said aromatically modified tackifying resin has a softening point of greater than about 90° C.

49. The pressure-sensitive adhesive construction of claim 44 wherein said aromatically modified tackifying resin has between from about 6% to about 35% by weight aromatic content.

50. The pressure-sensitive adhesive construction of claim 44 wherein said pressure-sensitive adhesive comprises:
 i) about 10 to about 40 wt. % of a styrene-isoprene block copolymer having about 5 to about 80% by weight styrene-isoprene diblock component;
 ii) about 5 to about 30 wt. % of a styrene-butadiene block copolymer having from about 20 to about 35 wt. % bound styrene and about 15 to about 20 wt. % block styrene;
 iii) about 30 to about 65 wt. % of an aromatically modified tackifying resin having between about 6 to about 35% aromatic content and a softening point above about 85° C.;
 iv) about 8 to about 30 wt. % of a plasticizing oil, and
 v) about 0.2 to about 2.0 wt. % of an antioxidant,
wherein said pressure-sensitive adhesive expresses a single glass transition temperature and has a tangent δ value of greater than about 0.5 for all temperatures in the range of about −20° C. to about 100° C.

51. The pressure-sensitive adhesive construction of claim 50 further comprising a release layer in contact with said pressure-sensitive adhesive layer.

52. The pressure-sensitive adhesive construction of claim 50 wherein said styrene-isoprene block copolymer comprises about 40 to about 60% by weight styrene-isoprene diblock component.

53. The pressure-sensitive adhesive construction of claim 50 wherein said styrene-isoprene block copolymer comprises about 50 to about 58% by weight styrene-isoprene diblock component.

54. The pressure-sensitive adhesive construction of claim 50 wherein said aromatically modified tackifying resin has a softening point of greater than about 85° C.

55. The pressure-sensitive adhesive construction of claim 50 wherein said aromatically modified tackifying resin has a softening point of greater than about 90° C.

* * * * *